United States Patent
Asai et al.

(10) Patent No.: US 7,587,375 B2
(45) Date of Patent: Sep. 8, 2009

(54) OPTIMIZATION METHOD AND OPTIMIZATION APPARATUS

(75) Inventors: Akira Asai, Atsugi (JP); Shigeki Matsutani, Sagamihara (JP); Katsuhiko Shinjo, Machida (JP); Masanori Kuroda, Isehara (JP); Daichi Tsutsumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 11/075,593

(22) Filed: Mar. 9, 2005

(65) Prior Publication Data

US 2005/0209898 A1 Sep. 22, 2005

(30) Foreign Application Priority Data

Mar. 15, 2004 (JP) .............................. 2004-073299

(51) Int. Cl.
*G06E 1/00* (2006.01)
*G06E 3/00* (2006.01)
*G06G 7/00* (2006.01)
(52) U.S. Cl. ...................................................... 706/19
(58) Field of Classification Search ................. 706/15, 706/46; 435/6
See application file for complete search history.

(56) References Cited

U.S. PATENT DOCUMENTS 5,386,507 A * 1/1995 Teig et al. .................. 715/836

OTHER PUBLICATIONS

'Elements of Artificial Neural Networks': Mehrotra, 1996, MIT press, 130-133.*
'Introduction to numerical methods': Stark, 1970, Macmillan, Library of Congress 77-85773, pp. 80-83.*
'Searching Minima of an N-Dimensional surface: A robust valley following method' Quapp, 2001, Pergamon, Computers and Mathematics with applications 41 (2001) 407-414.*
Japanese Patent 2002-62905, Perry, Japan, 2000.*

* cited by examiner

*Primary Examiner*—David R Vincent
*Assistant Examiner*—Peter Coughlan
(74) *Attorney, Agent, or Firm*—Canon U.S.A. Inc., I.P. Division

(57) ABSTRACT

The solution of a constrained optimization problem is easily solved by linearly approximating a point of interest to a first hypersurface given as a constraint and finding the extreme value of the objective function by moving a point r along a curved line having second-order osculation with the geodetic line of a hypersurface $S(r)=c$ and passing through the point r.

8 Claims, 12 Drawing Sheets

OPTIMIZATION METHOD AND OPTIMIZATION APPARATUS

BACKGROUND OF THE INVENTION

1. Field of the Invention

The present invention relates to solving a constrained optimization problem.

2. Description of the Related Art

Recently, there has been a demand for solving constrained optimization problems in various industrial fields. A constrained optimization problem is defined as a problem to be solved by finding a point at which the value of an objective function is maximized or minimized within a subset of points subject to constraints. In other words, solving a constrained optimization problem is to formulate the problem and select the optimal solution from among possible solutions.

A constrained optimization problem may be applied to automated design, such as determining design parameters for obtaining a desired specification. More specifically, a constrained optimization problem may applied to finding a molecular structure having a minimum level of energy, determining the interface shape of two types of liquids, or a liquid and a gas, held in a container at a constant volume, or determining optimal lens shape, lens spacing, and lens material for obtaining a desired optical characteristic.

A typical constrained optimization problem of minimizing the value of a real function $E(r)=0$ subject to the constraint $S(r)=0$ will be described below. Here, r is an n-dimensional real vector $$r = \begin{pmatrix} r_1 \\ r_2 \\ \vdots \\ r_n \end{pmatrix}$$

The problem of maximizing the real function can be solved by inverting the positive and negative signs of the same objective function.

In general, an algorithm for solving an unconstrained optimization problem finds a point r at which a function $E(r)$ is minimized, starting from an initial vector $r_{(0)}$, according to data related to a gradient vector $T=-\nabla E(r)$.

However, the solutions of a constrained optimization problem cannot be obtained by such a simple algorithm. Therefore, various methods for solving a constrained optimization problem have been developed. Some typical methods include the penalty method and the multiplier method (the method of Lagrangian undetermined multipliers). These methods are described in Chapter 9 of "Shinban suchikeisan hando-bukku (New Edition of Numerical Calculation Handbook)" (Tokyo: Ohmsha, 1990) edited by Yutaka Ohno and Kazuo Isoda.

The penalty method adds a penalty function $P(r)$ to the objective function $E(r)$ so that the value of the function becomes 0 when the constraint holds and becomes significantly large when the constraint is violated. In other words, in the penalty method, a newly introduced objective function $\Omega(r)=E(r)+P(x)$ is minimized. A typical penalty function may be $P(r)=\omega S(r)^2$, where $\omega$ is a positive number that is adjusted to a suitable value in the process of finding the local minimum.

The multiplier method makes a newly introduced objective function $\Omega(r, \lambda)=E(r)+\lambda S(r)$ stationary by introducing an undetermined multiplier $\lambda$. The objective function $\Omega(r, \lambda)=E(r)+\lambda S(r)$ is subject to the constraint $$\frac{\partial \Omega(r, \lambda)}{\partial \lambda} = 0$$

which is a stationary condition of $\Omega(r)$ with respect to $\lambda$.

However, these known methods for solving a constrained optimization have the following problems. For the penalty method, selecting the penalty function becomes a problem. In the case of $P(r)=\omega S(r)^2$, unless the value of $\omega$ is adjusted satisfactorily, the results of the computation do not converge to the correct value.

For the method of Lagrangian undetermined multipliers, although a local minimum of $E(r)$ is to be found, in actuality, in general, a saddle point of $\Omega(r)$ is obtained instead of the local minimum of $\Omega(r)$. Various algorithms for finding a saddle point have been proposed, but they are not as easy as the algorithms for finding local minima.

SUMMARY OF THE INVENTION

The present invention provides a method for easily solving a constrained optimization problem.

The present invention provides a method for converging the solution of the constrained optimization problem to a correct value.

According to one aspect of the present invention, a constrained optimization method includes steps of linearly approximating a point of interest to a first hypersurface given as a constraint and finding the extreme value of an objective function by moving a point of interest along a curved line having second-order osculation with the plane tangential to a second hypersurface associated with the first hypersurface, the second hypersurface passing through the point of interest.

According to another aspect of the present invention, a constrained optimization apparatus includes a linearly approximating unit for approximating a point of interest to a first hypersurface given as a constraint and a finding unit for finding the extreme value of an objective function by moving the point of interest along a curved line having second-order osculation with a plane tangential to a second hypersurface associated with the first hypersurface, the second hypersurface passing through the point of interest.

According to another aspect of the present invention, a computer-readable program controls a computer to perform optimization and includes code for causing the computer to perform steps of linearly approximating a point of interest to a first hypersurface given as a constraint and finding the extreme value of an objective function by moving the point of interest along a curved line having second-order osculation with a plane tangential to a second hypersurface associated with the first hypersurface, the second hypersurface passing through the point of interest.

Further features and advantages of the present invention will become apparent from the following description of example embodiments (with reference to the attached drawings).

DESCRIPTION OF THE EMBODIMENTS

Example embodiments of the present invention will now be described in detail with reference to the drawings.

First Embodiment

Figure 1:
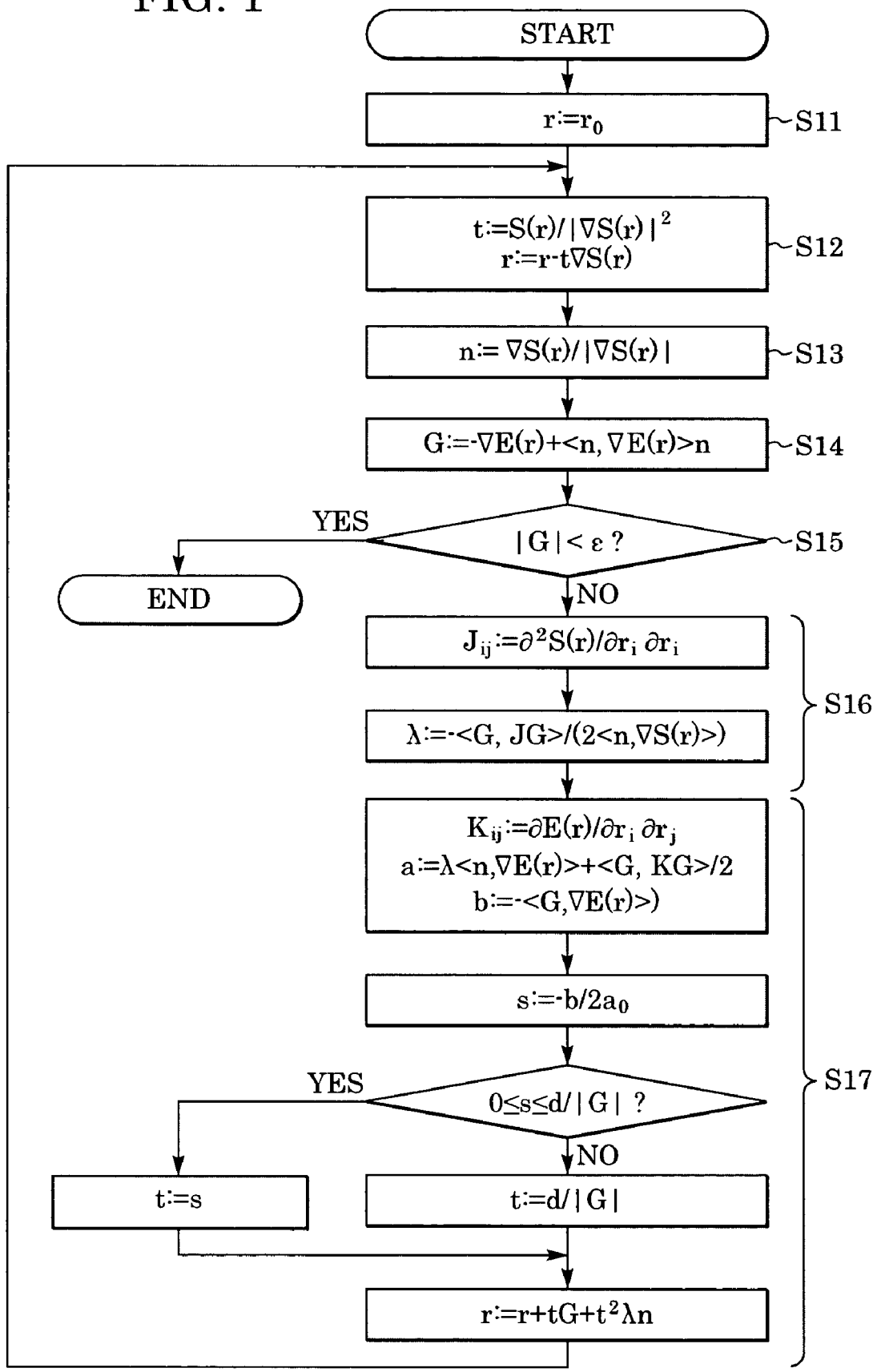
FIG. 1 is a flow chart illustrating an optimization algorithm according to a first embodiment of the present invention.

The method for optimization according to this embodiment includes two steps: linearly approaching the hypersurface $S(r)=0$ and finding an extreme value along a curved line having second-order osculation in the projection direction of the gradient vector of the plane tangential to the hypersurface $S(r)=c$. More specifically, the method includes the steps illustrated in the flow chart of FIG. 1. Each step is described below.

Step S11: Setting the initial value for a point r: The initial value of a point r is set as $r_0$ by $r:=r_0$. In this document, ":=" is a symbol indicating that the character(s) written on the right of this symbol (in the case where a formula is written, the value obtained by the formula) is set to the variable (a data item whose value can be changed in a computer program) written on the left of this symbol.

Step S12: Linearly approximating the hypersurface $S(r)=0$:

A straight line in the gradient direction of the hypersurface $S(r)=0$ is represented as $r(t)=r-t\nabla S(r)$, where t is a parameter. Since $S(r-t\nabla S(r))=S(r)-t<\nabla S(r), \nabla S(r)>+o(t)$ in the proximity of the point r, the point r approximates the hypersurface $S(r)=0$ by setting t and r as $$t := \frac{S(r)}{|\nabla S(r)|^2},$$

and $$r:=r-t\nabla S(r).$$

Here, "<, >" represents the inner product in a vector space and "||" represents the norm derived from the inner product.

Step S13: Calculating the unit normal vector: The unit normal vector n orthogonal to the hypersurface $S(r)=c$ passing through the point r is calculated by $$n := \frac{\nabla S(r)}{|\nabla S(r)|}.$$

Step S14: Projecting the gradient vector $-\nabla E(r)$ of the real function $E(r)$ onto the tangent plane:

The direction G that is a projection direction of the gradient vector $-\nabla E(r)$ of the real function $E(r)$ orthogonal to the plane tangential to the hypersurface $S(r)=c$ is calculated by $G:=-\nabla E(r)+<n, \nabla E(r)>n$.

Step S15: Determining convergence:

If the magnitude of G is smaller than $\epsilon$, the real function $E(r)$ is assumed to have been minimized, and the process is ended.

Step S16: Calculating the geodesic line:

The geodesic line that passes through the point r on the hypersurface $S(r)=c$ and is directed in the direction G is represented as $r(t)=r+tG+t^2\lambda n+o(t^2)$, where t is a parameter and $\lambda$ is a constant. Here, $\lambda$ is determined as shown below. In the proximity of the point r, $$S(r+\epsilon)=S(r)+<\epsilon, \nabla S(r)>+1/2<\epsilon, J\epsilon>+o(\epsilon^2)$$

Therefore, $$S(r + tG + t^2\lambda n) = S(r) + \langle tG + t^2\lambda n, \nabla S(r)\rangle + 1/2\langle tG, JtG\rangle + o(t^2)$$

$$= S(r) + t^2(\lambda\langle n, \nabla S(r)\rangle + 1/2\langle G, JG\rangle) + o(t^2).$$

In the equations above, $<G, \nabla S(r)>=0$. Here, J is a matrix having ij components represented by $$J_{ij} = \frac{\partial^2 S(r)}{\partial r_i \partial r_j}.$$

If the value of $\lambda$ is determined so that the coefficient of $t^2$ equals 0, then $$\lambda = -\frac{1}{2} \cdot \frac{\langle G, JG\rangle}{\langle n, \nabla S(r)\rangle}.$$

Step S17: Updating the point r along the quadratic curve:

For the real function $E(r)$, the value along the quadratic curve $r(t)=r+tG+t^2\lambda n$ having second-order osculation with the geodesic line passing through the point r and directed in the direction G is $$E(r(t)) = E(r) + \langle tG + t^2\lambda n, \nabla E(r)\rangle + t^2/2\langle G, KG\rangle + o(t^2)$$

$$= E(r) + tb + t^2 a + o(t^2).$$

Here, K is a matrix having ij components represented by $$K_{ij} = \frac{\partial^2 E(r)}{\partial r_i \partial r_j},$$

and a and b are calculated as $a = \lambda <n, \nabla E(r)> + 1/2 <G, KG>$, and $b = <G, \nabla E(r)>$.

Therefore, if a>0, the value of the real function E(r(t)) is minimized at t=−b/2a. The point r is preferably be updated by approximating the minimal value so that the value of t does not become too large. In other words, $s := -b/2a$ $$t := \begin{cases} s & \text{if } s \leq d/|G| \\ d/|G| & \text{otherwise} \end{cases},$$

$r := r + tG + t^2 \lambda n.$

Here, d is the upper limit of t|G|.

On the other hand, if a<0, the real function E(r(t)) does not have a local minimum. Therefore, the point r can be moved in the direction that reduces the value of the function E(r(t)) so that the point r is not moved a large distance. In other words, $t := d/|G|$ and $r := r + tG + t^2 \lambda n$.

Since b≦0, the cases described above can be combined to derived the following computational expressions:

$$s := -b/2a$$

$$t := \begin{cases} s & \text{if } 0 \leq s \leq d/|G| \\ d/|G| & \text{otherwise} \end{cases}, \text{ and}$$

$$r := r + tG + t^2 \lambda n.$$

Step S18: The process returns to Step S12.

Second Embodiment

Figure 2A:
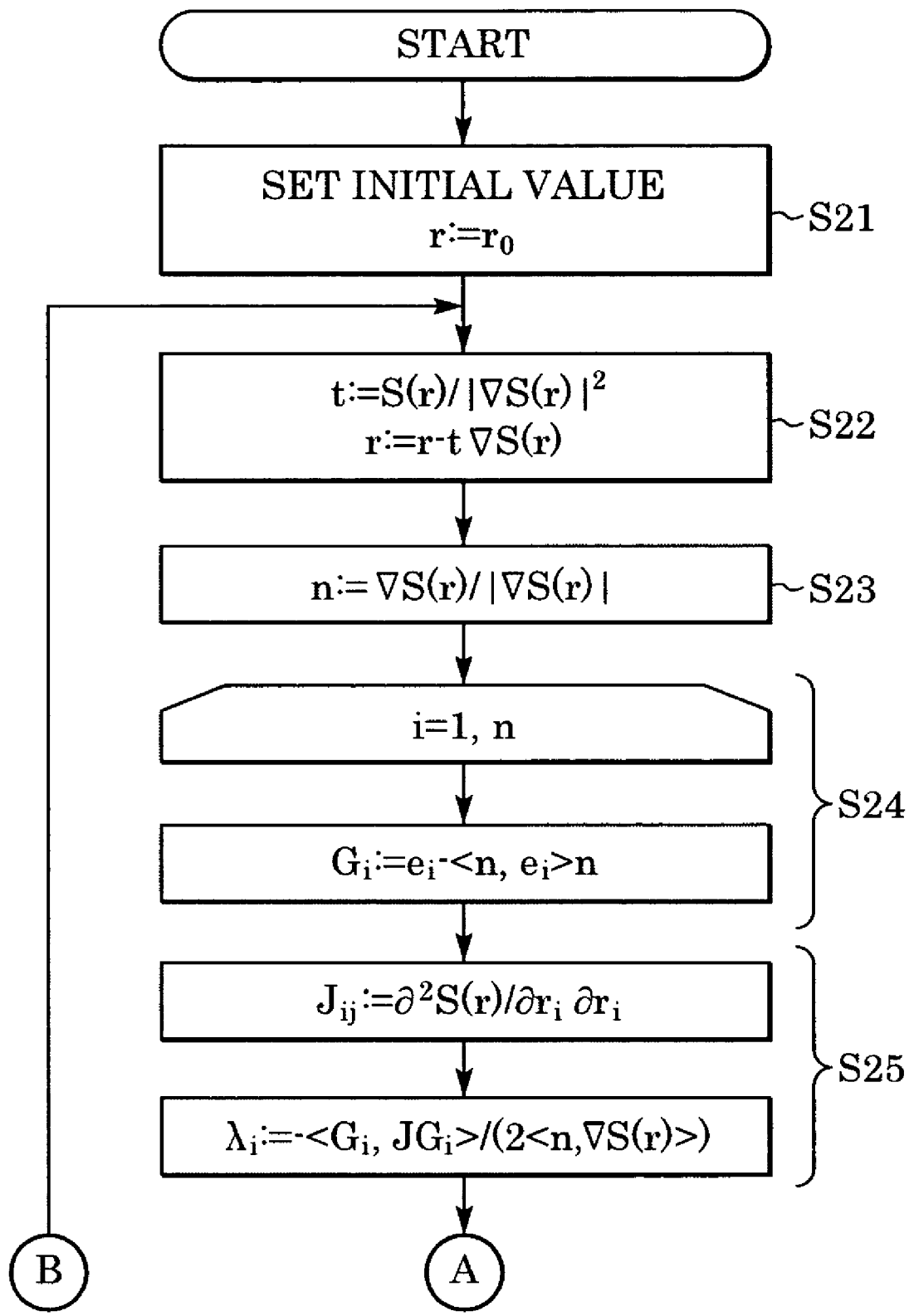
FIGS. 2A and 2B are flow charts illustrating an optimization algorithm according to a second embodiment of the present invention.
Figure 2B:
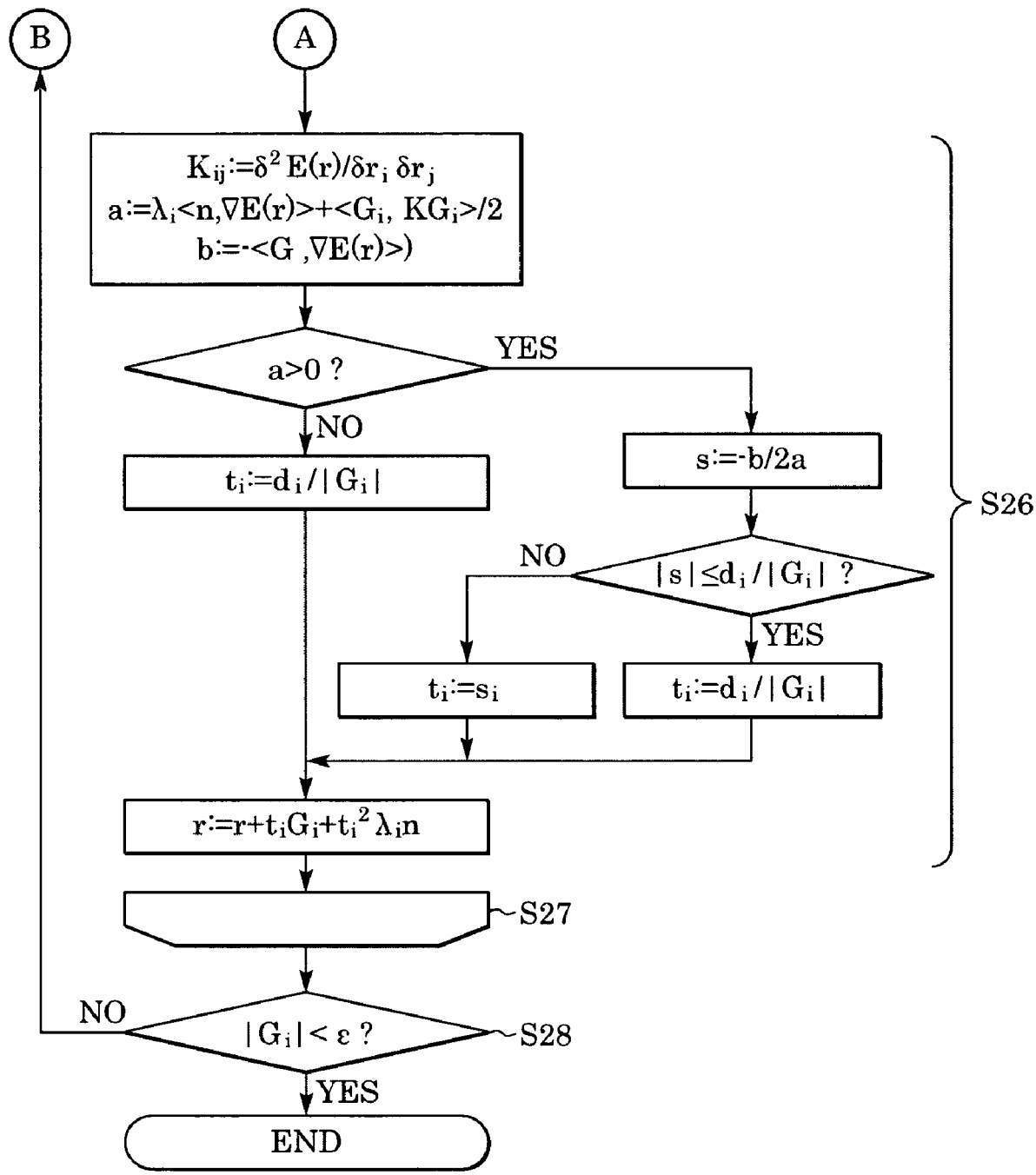

The method for optimization according to this embodiment includes two steps: linearly approximating the hypersurface S(r) and finding extreme values along curved lines having second-order osculation to the plane tangential to the hypersurface S(r)=c in the projection direction of the unit vectors of each axial direction of the coordinate system. More specifically, the method includes the steps illustrated in the flow chart of FIG. 2. Each step is described below.

Step S21: Setting the initial value of the point r: Each component of $r_{(0)}$ is $r_{1(0)}, r_{2(0)}, \ldots, r_{n(0)}$. These initial values $r_{1(0)}, r_{2(0)}, \ldots, r_{n(0)}$ are set in the variables $r_1, r_2, \ldots, r_n$ whereas $$r = \begin{pmatrix} r_1 \\ r_2 \\ \vdots \\ r_n \end{pmatrix}, r_1, r_2, \ldots, r_n \in R.$$

Step S22: Linearly approximating the hypersurface S(r)=0:

A straight line in the gradient direction of the hypersurface S(r)=0 is represented as r(t)=r−t∇S(r), where t is a parameter. Since S(r−t∇S(r))=S(r)−t<∇S(r), ∇S(r)>+o(t) in the proximity of the point r, the point r approximates the hypersurface S(r)=0 by setting S, t, and r as $S(r - t\nabla S(r)) \approx 0$ $$t := \frac{S(r)}{|\nabla S(r)|^2},$$

and $r := r - t\nabla S(r)$

Here, "<, >" represents the inner product in a vector space and "||" represents the norm derived from the inner product.

Step S23: Calculating a unit normal vector:

The unit normal vector n orthogonal to the hypersurface S(r)=c passing through the point r is calculated by $$n := \frac{\nabla S(r)}{|\nabla S(r)|}.$$

Then, Steps 24 to 26 are carried out in sequence for each direction i=1, . . . , n.

Step 24: Projecting the unit vector $e_i$ of direction i onto the tangent plane:

If $G_i$ is the vector of the unit vector $e_i$ of a direction i projected onto the tangent plane, then $G_i := e_i - <n, e_i>n$.

Step 25: Determining an unknown parameter of the updated amount of the point r:

The updated amount of the point r is $t_i G_i + t_i^2 \lambda_i n$, where t is a parameter and $G_i$ is the projection vector of the unit vector projected in the direction i onto the plane tangential to hypersurface S(r)=c. Here, if the updated point r is represented as $r(t_i)$, then $r(t_i) = r + t_i G_i + t_i^2 \lambda_i n + o(t_i^2)$, where $\lambda_i$ is a constant determined as shown below. In the proximity of the point r, $$S(r + t_i G_i + t_i^2 \lambda_i n) = S(r) + <t_i G_i + t_i^2 \lambda_i n, \nabla S(r)> + 1/2 <t_i G_i,$$

$$Jt_i G_i > + o(t_i^2)$$

$$= S(r) + t_i^2 <\lambda_i n, \nabla S(r)> + 1/2 <G_i, JG_i> + o(t_i^2).$$

In the equations above, $\langle G_i, \nabla S(r)\rangle = 0$. Here, J is a matrix having ij components represented by $$J_{ij} = \frac{\partial^2 S(r)}{\partial r_i \partial r_j}.$$

If the value of $\lambda_i$ is determined so that the coefficient of $t_i^2$ equals 0, then $$\lambda_i := -\frac{1}{2}\frac{\langle G_i, JG_i\rangle}{\langle n, \nabla S(r)\rangle}.$$

Step 26: Updating the point $r(i=1, \ldots, n)$:

For the real function $E(r)$, the value along the quadratic curve $r(t_i) = r + t_i G_i + t_i^2 \lambda_i n + o(t_i^2)$ having second-order osculation and passing through the point r is $$E(r + t_i G_i + t_i^2 \lambda_i n) = E(r) + \langle t_i G_i + t_i^2 \lambda_i n, \nabla E(r)\rangle + t_i^2/2 \langle G_i, KG_i\rangle + o(t_i^2)$$
$$= E(r) + t_i b + t_i^2 a + o(t_i^2).$$

Here, K is a matrix having ij components represented by $$K_{ij} = \frac{\partial^2 E(r)}{\partial r_i \partial r_j}$$

and a and b are calculated as $a = \lambda_i \langle n, \nabla E(r)\rangle + 1/2 \langle G_i, KG_i\rangle$ $b = \langle G_i, \nabla E(r)\rangle$.

Therefore, if $a > 0$, the value of the real function $E(r(t_i))$ is minimized at $t_i = -b/2a$. The point r is preferably updated by approximating the minimal value so that the value of $t_i$ does not become too large. In other words, $$s := -b/2a$$
$$t_i := \begin{cases} s & \text{if } |s| \leq d_i/|G_i| \\ d_i/|G| & \text{otherwise} \end{cases}$$
$$r := r + t_i G_i + t_i^2 \lambda_i n$$

where, $d_i$ is the upper limit of $t_i|G_i|$.

On the other hand, if $a < 0$, the real function $E(r(t_i))$ does not have a local minimum. Therefore, the point r can be moved in the direction that reduces the value of the function $E(r(t_i))$ so that the point r is not moved a large distance. In other words, $t_i := d_i/|G_i|$ and $r(t_i) := r + t_i G_i + t_i^2 \lambda_i n$.

Step 27: The process returns to Step 24 and processes the next i.

Step 28: Determining convergence:

If $|G_i|$ for each direction $i(i=1, \ldots, n)$ is smaller than the convergence $\epsilon$, the real function $E(r(t_i))$ is assumed to have been minimized, and the process is ended.

Step 29: The process returns to Step 22.

Third Embodiment

The optimization algorithm according to this embodiment includes two steps: linearly and asymptotically approximating a hypersurface $S(r) = 0$ as a constraint and finding an extreme value in the projection direction onto a plane tangential to the hypersurface $S(r) = c$.

The optimization algorithm according to this embodiment is extremely effective in solving the problem of determining the interface shape of two types of liquids, or a liquid and a gas, held in a container at a constant volume.

This kind of problem is formulated into a problem of minimizing the sum of the surface energy and the gravitational energy of the liquids (or liquid and gas). When generalized, such a constrained optimization problem can be perceived as a problem of finding the local minimum of the formulated real function $E(r)$ subject to the constraint $S(r) = 0$.

Figure 3A:
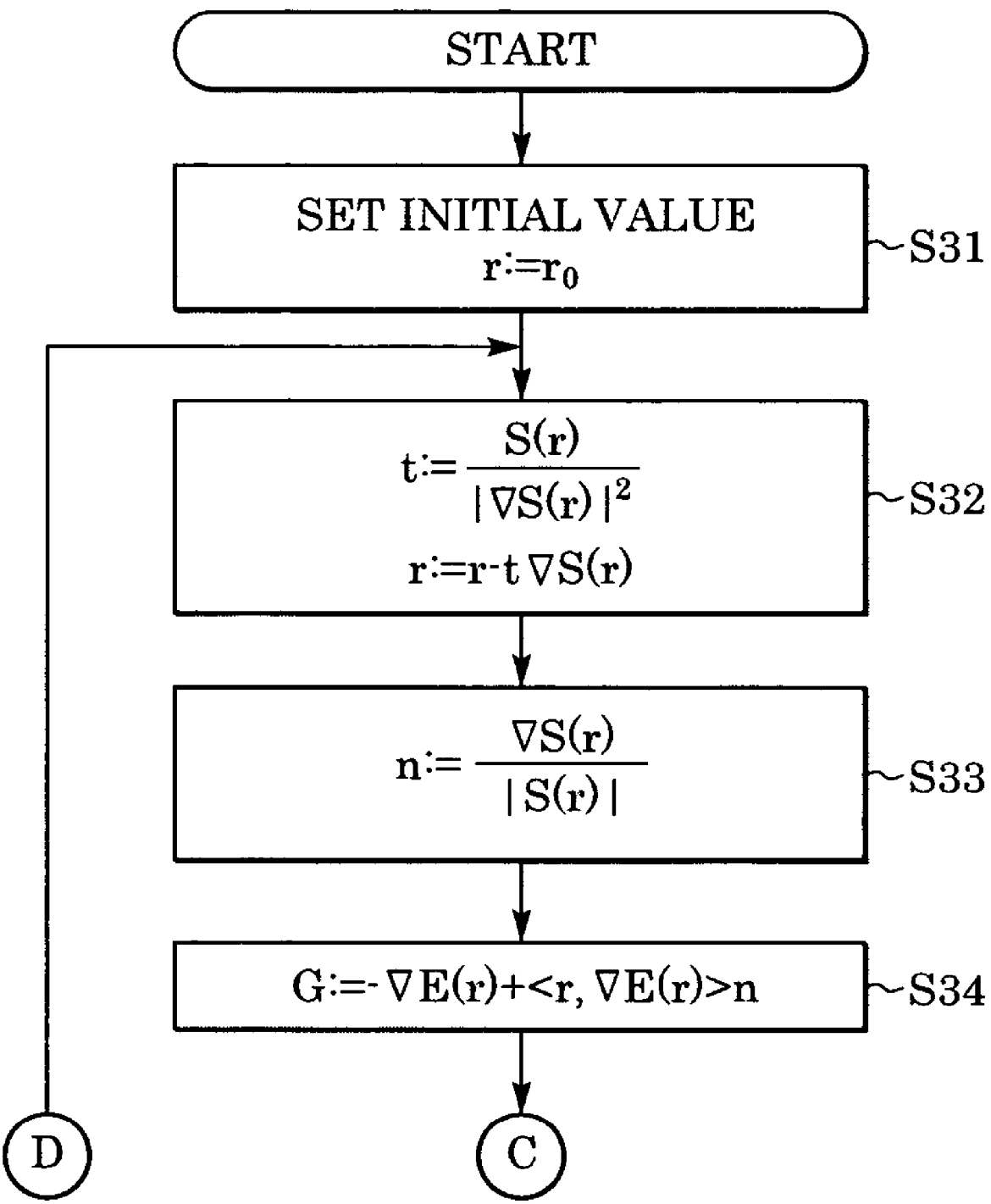
FIGS. 3A and 3B are flow charts illustrating an optimization algorithm according to a third embodiment of the present invention.
Figure 3B:
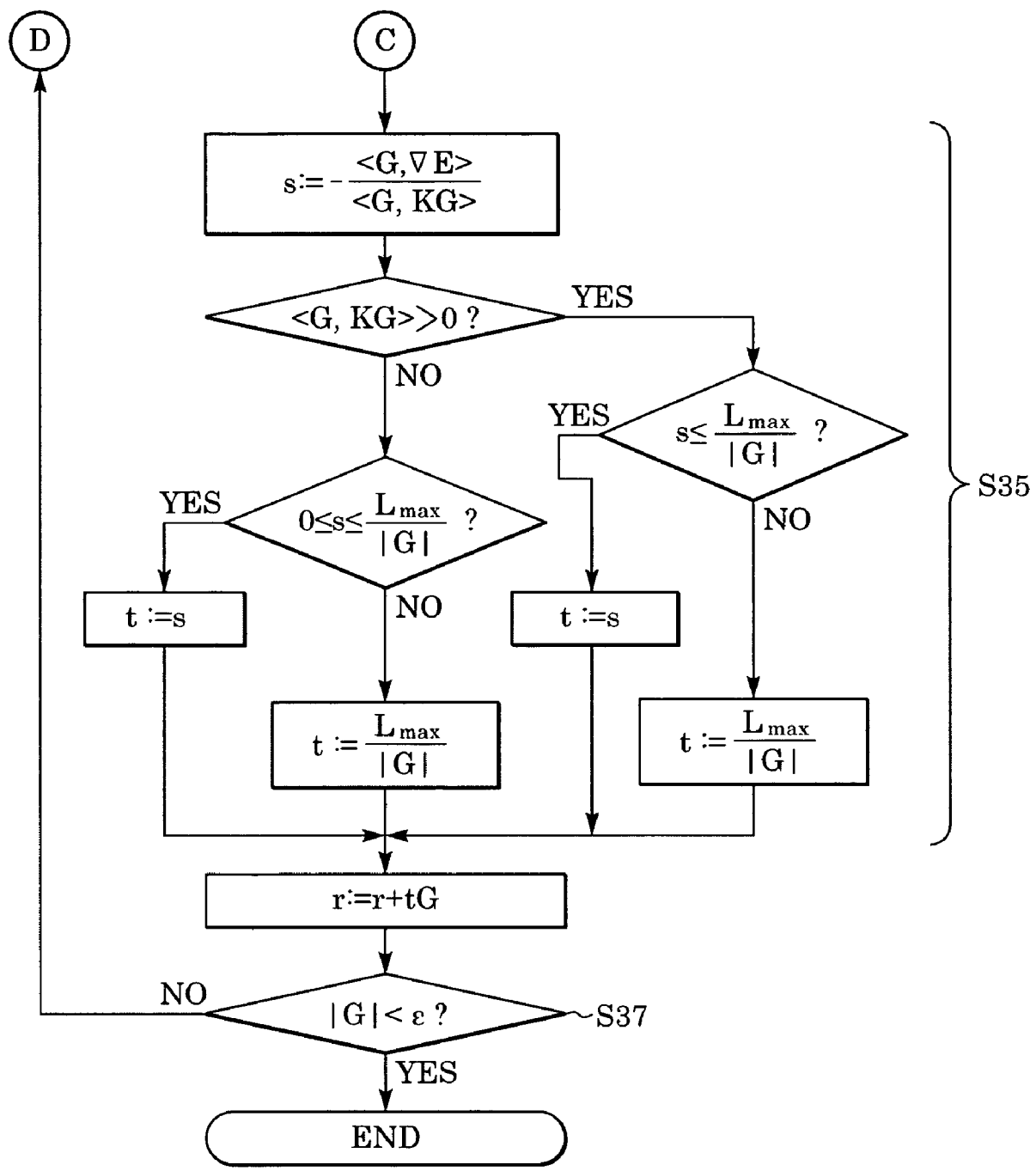

Accordingly, the optimization algorithm according to this embodiment includes the steps illustrated in the flow chart of FIG. 3. Each step is described below.

Step S31: Setting the initial value for a point r:

The initial value of a point r is set as $r_0(r := r_0)$.

Step S32: Linearly approximating the hypersurface $S(r)$:

A straight line in the gradient direction of the hypersurface $S(r)$ is represented as $r(t) = r - t\nabla S(r)$, where t is a parameter. Since $S(r - t\nabla S(r)) = S(r) - t\langle \nabla S(r), \nabla S(r)\rangle + o(t)$ in the proximity of the point r, the point r approximates the hypersurface $S(r)$ by setting t and r as $$t := \frac{S(r)}{|\nabla S(r)|^2},$$

and $r := r - t\nabla S(r)$.

Here, "$\langle, \rangle$" represents the inner product in a vector space and "$\|\|$" represents the norm derived from the inner product.

Step S33: Calculating the unit normal vector:

The unit normal vector n orthogonal to the hypersurface $S(r) = c$ passing through the point r is calculated by $$n := \frac{\nabla S(r)}{|\nabla S(r)|}.$$

Step S34: Projecting the gradient vector $-\nabla E(r)$ of the real function $E(r)$ onto the tangent plane:

The direction G that is the projection direction of the gradient vector $-\nabla E(r)$ of the real function $E(r)$ orthogonal to the plane tangential to the hypersurface $S(r) = c$ is calculated by $G := -\nabla E(r) + \langle r, \nabla E(r)\rangle + \rangle n$.

Step S35: Geodesic line:

The geodesic line that passes through the point r on the hypersurface $S(r) = c$ and is directed in the direction G is represented as $r(t) = r + tG$, where t is a parameter. Here, the value of the real function $E(r)$ along this geodesic line is $$E(r+tG) = E(r) + \langle tG, \nabla E(r)\rangle + t^2/2\langle G, KG\rangle + o(t^2)$$
$$= E(r) + \frac{1}{2}\langle G, KG\rangle \left(t + \frac{\langle G, \nabla E(r)\rangle}{\langle G, KG\rangle}\right)^2 -$$
$$\frac{1}{2}\frac{\langle G, \nabla E(r)\rangle^2}{\langle G, KG\rangle} + o(t^2).$$

Here, K is a matrix having ij components represented by $$K_{ij} = \frac{\partial^2 E(r)}{\partial r_i \partial r_j}.$$

In the equations above, if $\langle G, KG\rangle > 0$, the value of the real function $E(r)$ is minimized at $$t := -\frac{\langle G, \nabla E(r)\rangle}{\langle G, KG\rangle}.$$

The point r is preferably updated by approximating the minimal value so that the value of t does not become too large. In other words, $$s := -\frac{\langle G, \nabla E(r)\rangle}{\langle G, KG\rangle}$$
$$t := \begin{cases} s & \text{if } s \leq Lmax/|G| \\ Lmax/|G| & \text{otherwise} \end{cases}$$

if s≦Lmax/|G|otherwise $r:=r+tG.$

On the other hand, if $\langle G, KG\rangle < 0$, the real function $E(r)$ does not have a local minimum. Therefore, the point r can be moved in the direction that reduces the value of the function $E(r)$ so that the point r is not moved a large distance. In other words, $$t := \frac{Lmax}{|G|}$$

$r:=r+tG.$

Since $\langle G, \nabla E(r)\rangle \leq 0$, the two equations described above can be combined to derive the following expressions:

$$s := -\frac{\langle G, \nabla E(r)\rangle}{\langle G, KG\rangle}$$
$$t := \begin{cases} s & \text{if } 0 \leq s \leq Lmax/|G| \\ Lmax/|G| & \text{otherwise} \end{cases}$$

if 0≦s≦Lmax/|G|otherwise $r:=r+tG$ where Lmax is the upper limit of t|G|.

Step 36: The process returns to Step 32.

Step S37: Determining convergence:

If the |G| is smaller than the convergence ϵ, the real function $E(r)$ is assumed to have been minimized, and the process is ended.

Figure 4:
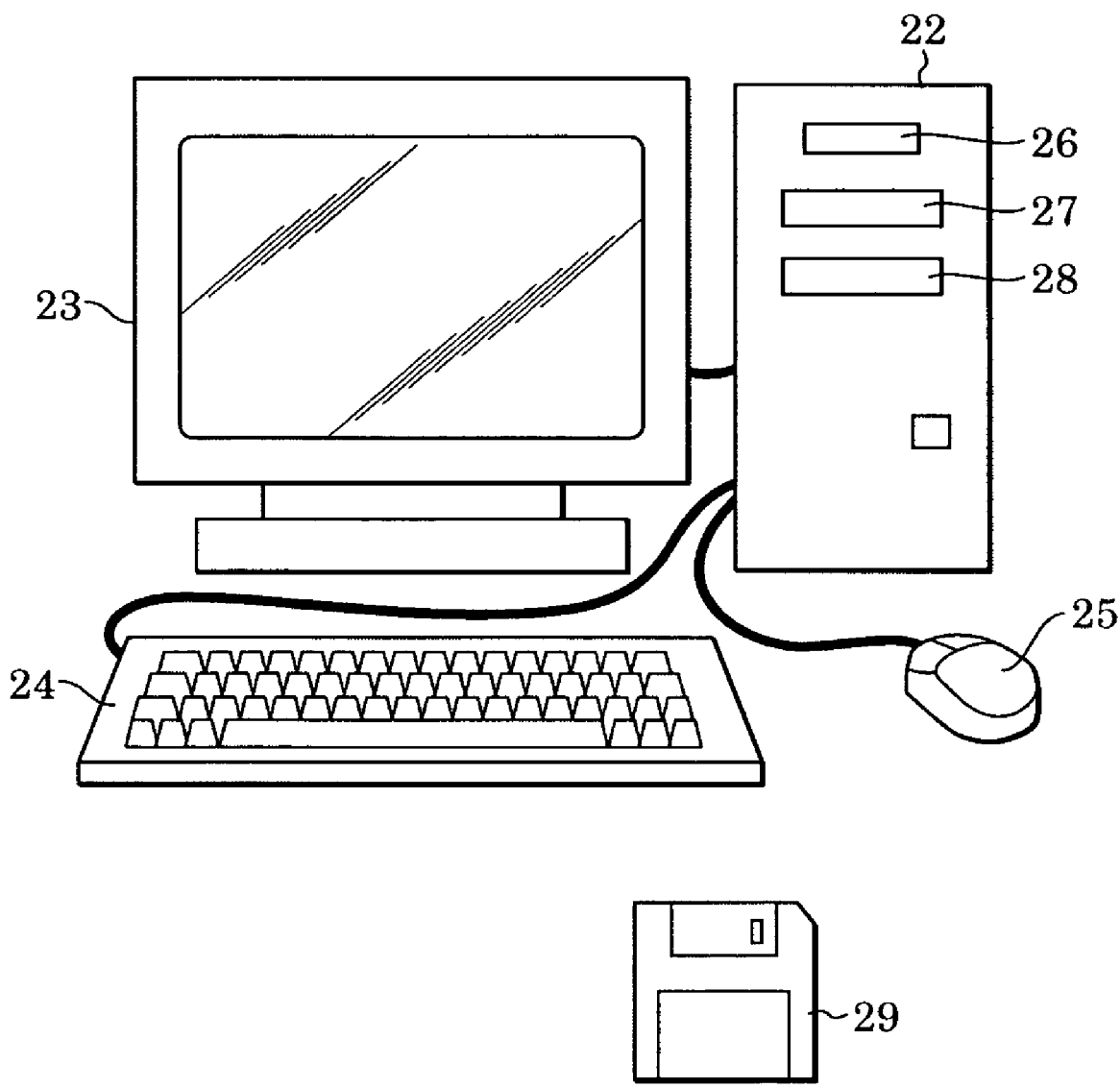
FIG. 4 illustrates the system configuration of a computer system for employing the embodiments of the present invention.

FIG. 4 illustrates the system configuration of a computer system adopting the method for solving a constrained optimization problem according to the embodiments of the present invention. The above-described optimization algorithm is executed in such a computer system illustrated in FIG. 4.

In FIG. 4, a multi-purpose computer 22 is equipped with a central processing unit (CPU), a read only memory (ROM), a random access memory (RAM), a floppy disk drive 26, a compact disk read only memory (CD-ROM) drive 27, and a hard disk device 28. The computer 22 is connected to a monitor 23, and an input/output device, such as a keyboard 24 and a mouse 25, allowing various data to be input to and output from the computer 22.

The program, including an optimization algorithm, for solving an optimization problem according to this embodiment is recorded on the floppy disk 29. The floppy disk 29 is loaded into the floppy disk drive 26 and then the program for solving an optimization problem stored on the floppy disk 29 is downloaded into the computer 22. The program is stored into the RAM and is executed. The program may be recorded on media other than a floppy disk, for example, a CD-ROM or a hard disk.

While executing the program for solving an optimization problem, the minimal value at each predetermined time interval is displayed on the monitor 23 so that the found minimal value can be monitored in real time by an observer.

Figure 5:
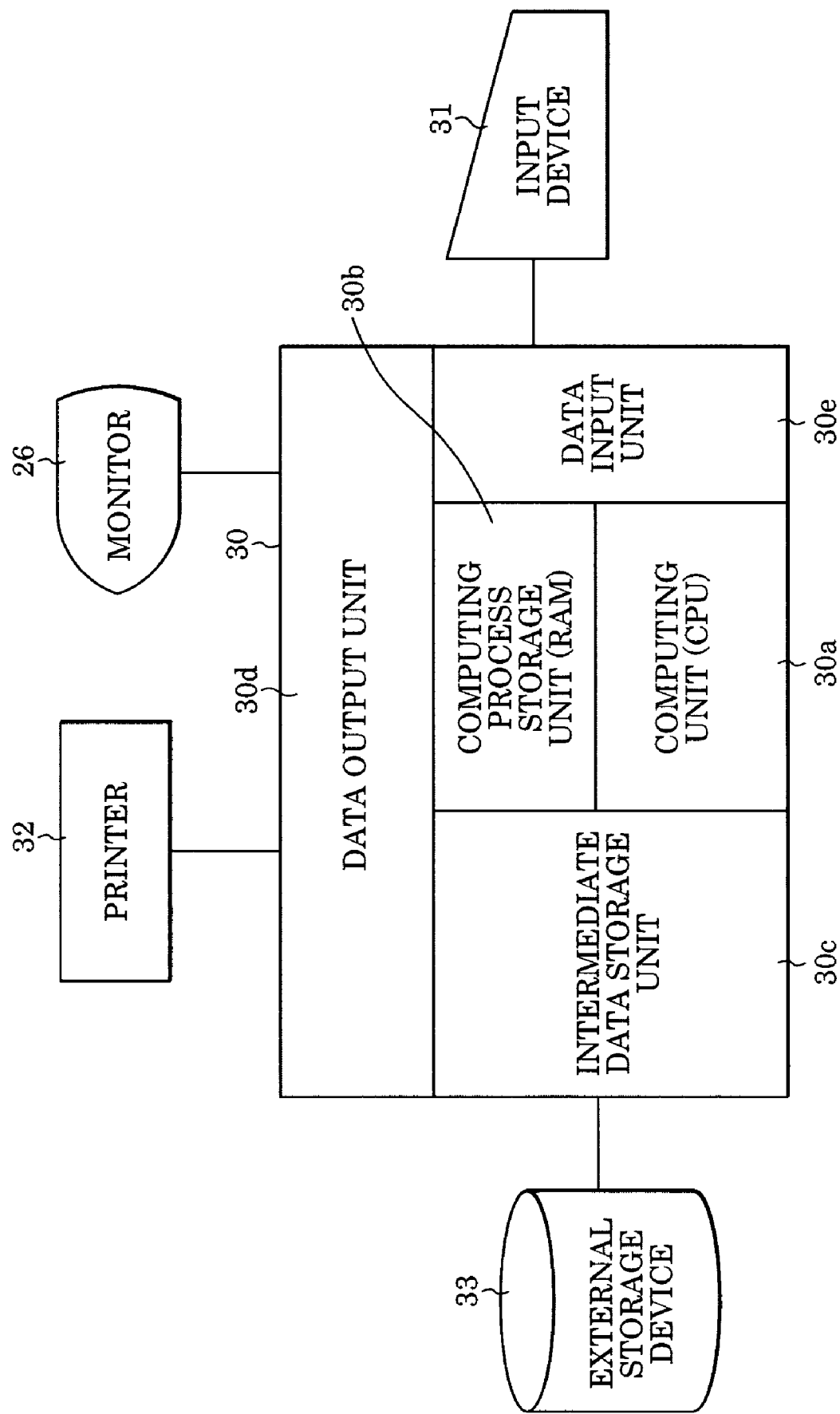
FIG. 5 is a functional block diagram of a computer system for employing the embodiments of the present invention.

FIG. 5 is a functional block diagram of a computer system for adopting the method for solving a constrained optimization problem according to the embodiments of the present invention.

In FIG. 5, the processing unit 30 includes a computing unit 30a, a computing-process storage unit 30b, an intermediate-data storage unit 30c, a data output unit 30d, and an input unit 30e. The input unit 30e is used to input the program for solving an optimization problem to the processing unit 30. The processing unit 30 is connected to an input device 31, a printer 32, a monitor 23, and an external storage device 33.

The processing unit 30, illustrated in FIG. 5, is installed into the computer 22, illustrated in FIG. 4. The computing unit 30a includes at least the above-mentioned CPU. The computing-process storage unit 30b is included in the RAM. The program for solving an optimization problem is read out from the external storage device 33, such as the floppy disk drive 26, the CD-ROM drive 27, or the hard disk device 28, and is stored in the RAM.

The computing unit 30a executes the program for solving an optimization problem stored in the computing-process storage unit 30b. At the same time, the computing unit 30a stores intermediate computed results and the final computed results in the intermediate-data storage unit 30c and saves the final computed results in the external storage device 33. The computing unit 30a prints out the final computed results stored in the intermediate-data storage unit 30c from the printer 32 via the data output unit 30d. The computing unit 30a also displays, in real time, the final computed results on the monitor 23 via the data output unit 30d.

The input device 31 includes the keyboard 24 and the mouse 25, as illustrated in FIG. 4. The input device 31 controls the execution of various application programs such as the program for solving an optimization problem according to the present invention. The input device 31 is also used for inputting various commands and data. The input commands and data are input to the processing unit 30 via the data input unit 30e.

First Example Application

A first example application of the embodiments of the present invention is described next.

The constrained optimization algorithm according to the first example application is based on the first embodiment of the present invention and includes two steps: linearly approximating the hypersurface $S(r)=0$ and finding an extreme value along a curved line having second-order osculation with the geodetic line of the hypersurface $S(r)=c$ passing through a point r. Here, for the two-dimensional real vector $$r = \begin{pmatrix} x \\ y \end{pmatrix},$$

$x, y \in R$, the real function $E(r)$ is to be minimized subject to the constraint condition $S(r)=0$ where $$S(r) = \frac{x^2}{a^2} + \frac{y^2}{b^2} - 1$$

$$E(r) = x^2 + y^2.$$

This problem can be solved according to the steps described below.

First Step: Setting the initial value for a point r:

The initial values $x_{(0)}$ and $y_{(0)}$ are set as $x := x_{(0)}$ and $y := y_{(0)}$.

Second Step: Linearly approximating the hypersurface $S(r)=0$:

$$S := \frac{x^2}{a^2} + \frac{y^2}{b^2} - 1$$

$$S_x := \frac{2x}{a^2}$$

$$S_y := \frac{2y}{b^2}$$

$$t := \frac{S}{S_x^2 + S_y^2}$$

$x := x - tS_x$ $y := y - tS_y$

Third Step: The unit normal vector n of the hypersurface $S(r)=c$ passing through the point r:

$$n_x := \frac{S_x}{\sqrt{S_x^2 + S_y^2}}$$

-continued $$n_y := \frac{S_y}{\sqrt{S_x^2 + S_y^2}}$$

Fourth Step: Projecting the gradient vector of the real function $E(r)$ to the tangent plane:

$E_x := 2x$ $E_y := 2y$ $G_x := -E_x + (n_x E_x + n_y E_y) n_x$ $G_y := -E_y + (n_x E_x + n_y E_y) n_y$

Fifth Step: Determining convergence:

If $|G| < \epsilon$, then the process is ended.

Sixth Step: Coefficient of the geodetic line equation:

$$\lambda := -\frac{G_x^2/a^2 + G_y^2/b^2}{n_x S_x + n_y S_y}$$

Seventh Step: Updating the point r along the quadratic curve:

$a := \lambda(n_x E_x + n_y E_y) + G_x^2 + G_y^2$ $b := G_x E_x + G_y E_y$ $s := -b/2a$ $$t := \begin{cases} s & \text{if } 0 \le t \le d/\sqrt{G_x^2 + G_y^2} \\ d/\sqrt{G_x^2 + G_y^2} & \text{otherwise} \end{cases}$$

$x := x + tG_x + t^2 \lambda n_x$ $y := y + tG_y + t^2 \lambda n_y$

Eighth Step: The process returns to the second step.

Figure 6:
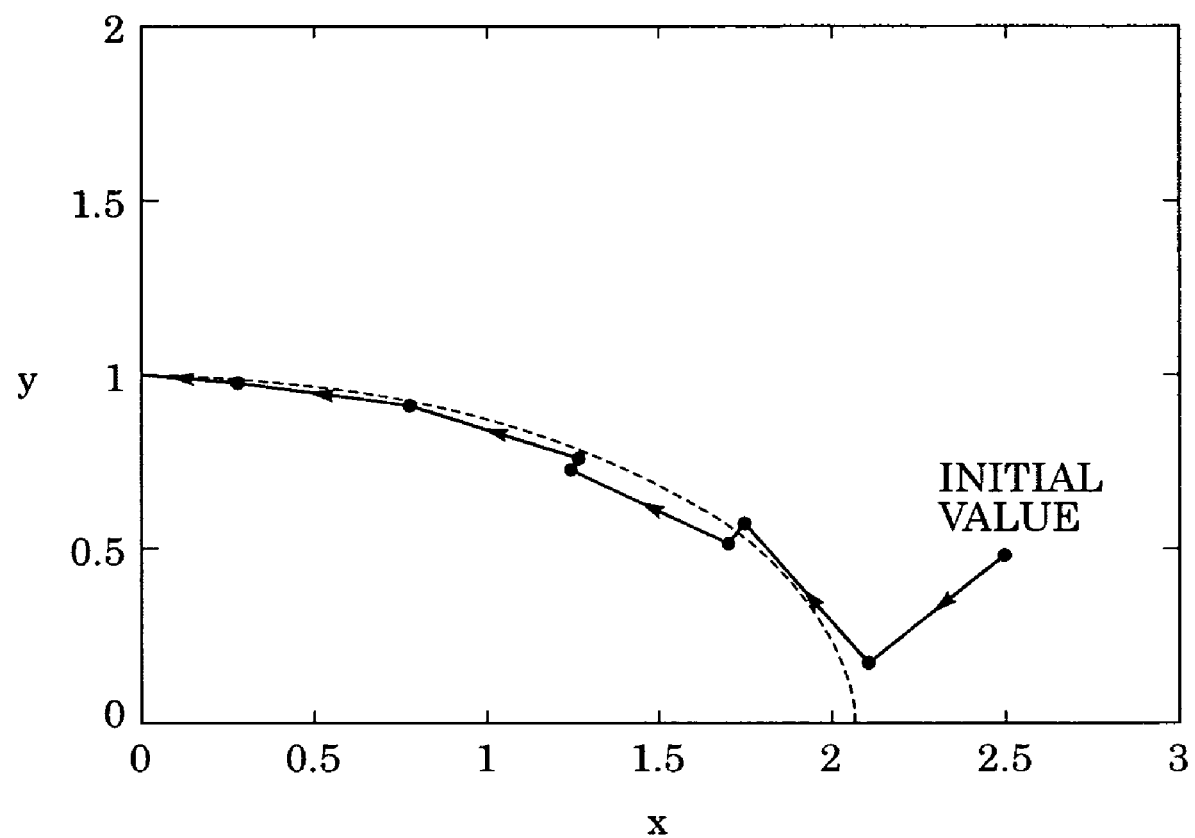
FIG. 6 shows the calculation results according to a first example application.

As an example of the computation, the results of executing the above-described steps, where $a=2$, $b=1$, $x_0=2.5$, $y_0=0.5$, $d=0.5$, and $\epsilon=10^{-8}$ are illustrated in FIG. 6.

As illustrated in FIG. 6, the values start from the initial values (2.5, 0.5) and converge to the values (0.0, 1.0) that minimize the real function $E(x, y)$.

Second Example Application

The constrained optimization algorithm according to a second example application is similar to the first example application in that it is based on the first embodiment of the present invention and includes two steps: linearly approximating the hypersurface $S(r)=0$ and finding an extreme value along a curved line having second-order osculation with the geodetic line of the hypersurface $S(r)=c$ passing through a point r. Here, p that minimizes the real function $E(\rho) = T_r[(3\rho^2 + 2\rho^3)H]$ subject to the constraint condition $S(\rho)=0$ and the value of the real function $E(\rho)$ are to be determined, where $\rho$ and $H$ are real symmetric matrices of m×n and $N_e$ is a positive value, $S(\rho)$ is a function defined as $$S(\rho)=T_r[3\rho^2-2\rho^3]-N_e,$$

and $T_r$ is the trace of the matrix. In this case, the problem of determining the ground state of an independent $N_e$ electron system denoted in a Hamiltonian matrix H is formulated using a density matrix (X. -P. Li, R. W. Nues, and D. Vanderbilt, Physical Review B, Vol. 47, p. 10891, 1993).

A known method for solving this problem is the method using a chemical potential (which can be understood as a type of multiplier method) (SY Qui, C. Z. Wang, K. M. Ho, and C. T. Chan, Journal of Physics: Condensed Matter, Vol. 6, p. 9153, 1994).

If the real symmetric matrix p is a vector having $m(m-1)/2$ independent components and the inner product of two symmetric matrixes $\rho_1$ and $\rho_2$ is defined as $<\rho_1,\rho_2>=T_r(\rho_1\rho_2)$, this problem can be solved by applying the optimization algorithm according to this embodiment through the steps described below.

First Step: Setting the initial value for the real symmetric matrix $\rho$:

The initial matrix $\rho_{(0)}$ is used to set $\rho:=\rho_{(0)}$.

Second Step: Linearly approximating the hypersurface $S(\rho)=0$:

$$S:=T_r[3\rho^2-2\rho^3]-N_e$$

$$D:=6(\rho-\rho^2)$$

$$t:=\frac{S}{T_r(D^2)}$$

$$\rho:=\rho-tD$$

Third Step: The unit normal vector (m×m real symmetric matrix) N to the hypersurface $S(\rho)=c$ passing through the point $\rho$:

$$D:=6(\rho-\rho^2)$$

$$\alpha:=T_r(D^2)$$

$$N:=\frac{D}{\sqrt{\alpha}}$$

Fourth Step: Projecting the gradient vector of the real function $E(r)$ to the tangent plane:

$$F=-3(\rho H-H\rho)+2(\rho^2 H+\rho H\rho+H\rho^2)$$

$$G:=F-T_r(NF)N$$

Fifth Step: Determining convergence:

If $\sqrt{T_r(G^2)}<\epsilon$, then the process is ended.

Sixth Step: Coefficient of the geodetic line equation:

$$\lambda := -\frac{3T_r(G^2) - 6T_r(\rho G^2)}{\sqrt{\alpha}}$$

Seventh Step: Updating the point r along the quadratic curve:

$$a := 3T_r[G^2 H] - 2T_r[\rho G^2 H + G\rho GH + G^2 \rho H] + \frac{\lambda}{\sqrt{\alpha}} T_r[D^2 H]$$

$$b:=-T_r[GF]$$

$$s:=-b/2a$$

$$t := \begin{cases} s & \text{if } 0 \le t \le d/\sqrt{T_r(G^2)} \\ d/\sqrt{T_r(G^2)} & \text{otherwise} \end{cases}$$

$$\rho:=\rho+tG+t^2\lambda N$$

Eighth Step: The process returns to the second step.

By using an algorithm that includes a step of linearly approximating the hypersurface $S(r)=0$ and a step of finding an extreme value along a curved line having second-order osculation with the geodetic line of the hypersurface $S(r)=c$ passing through a point r, the solution to a constrained optimization problem can be derived through a simple calculation process.

Third Example Application

The constrained optimization algorithm according to a third example application is based on the second embodiment of the present invention and includes two steps: linearly approximating the hypersurface $S(r)$ and finding extreme values along curved lines having second-order osculation to the plane tangential to the hypersurface $S(r)=c$ in the projection direction of the unit vectors of each axial direction of the coordinate system. Here, for the two-dimensional real vector $$r = \begin{pmatrix} x \\ y \end{pmatrix},$$

$x, y \in R$, the real function $E(r)$ is to be minimized subject to the constraint condition $S(r)=0$ where $$S(r) = \frac{x^2}{a^2} + \frac{y^2}{b} - 1$$

$$E(r)=x^2+y^2.$$

This problem can be solved according to the steps described below.

First Step: Setting the initial value for a point r:

The initial values $x_{(0)}$ and $y_{(0)}$ are set as $x:=x_{(0)}$ and $y:=y_{(0)}$.

Second Step: Linearly approximating the hypersurface S(r)=0:

$$S := \frac{x^2}{a^2} + \frac{y^2}{b^2} - 1$$

$$S_x := \frac{2x}{a^2}$$

$$S_y := \frac{2y}{b^2}$$

$$t := \frac{S}{S_x^2 + S_y^2}$$

$$x := x - tS_x$$

$$y := y - tS_y$$

Third Step: The unit normal vector n of the hypersurface S(r)=c passing through the point r:

$$n_x := \frac{S_x}{\sqrt{S_x^2 + S_y^2}}$$

$$n_y := \frac{S_y}{\sqrt{S_x^2 + S_y^2}}$$

Fourth Step: Projecting the unit vector $e_i$ of a direction i onto the tangent plane (i=1, 2):

for i=1, $$G_{1x} = 1 - n_x^2$$

$$G_{1y} = -n_x n_y$$

for i=2, $$G_{2x} = -n_x n_y$$

$$G_{2y} = 1 - n_y^2$$

Fifth Step: Determining an unknown parameter $\lambda_i$:

for i=1, $$\lambda_1 := -\frac{b^2(1-n_x^2)^2 + a^2 n_x^2 n_y^2}{a^2 b^2 (n_x S_x + n_y S_y)}$$

for i=2, $$\lambda_2 := -\frac{b^2 n_x^2 n_y^2 + a^2(1-n_y^2)^2}{a^2 b^2 (n_x S_x + n_y S_y)}$$

Sixth Step: Updating the point r(i=1, 2):

$$a := 1$$

$$b : \begin{cases} 2x & (\text{if } i=1) \\ 2y & (\text{if } i=2) \end{cases}$$

$$s := -b/2a$$

$$t_i := \begin{cases} s & \text{if } |s| \le d_i / |G_i| \\ d_i / |G_i| & \text{otherwise} \end{cases}$$

$$x := x + t_i G_{ix} + t_i^2 \lambda_i n_x$$

$$y := y + t_i G_{iy} + t_i^2 \lambda_i n_y$$

Seventh Step: The process returns to the fourth step.

Eighth Step: Determining convergence:

If $|G_i|$ for each of the directions i(i=1, 2) is smaller than the convergence $\epsilon$, the real function E(r) is assumed to have been minimized, and the process is ended.

Figure 7:
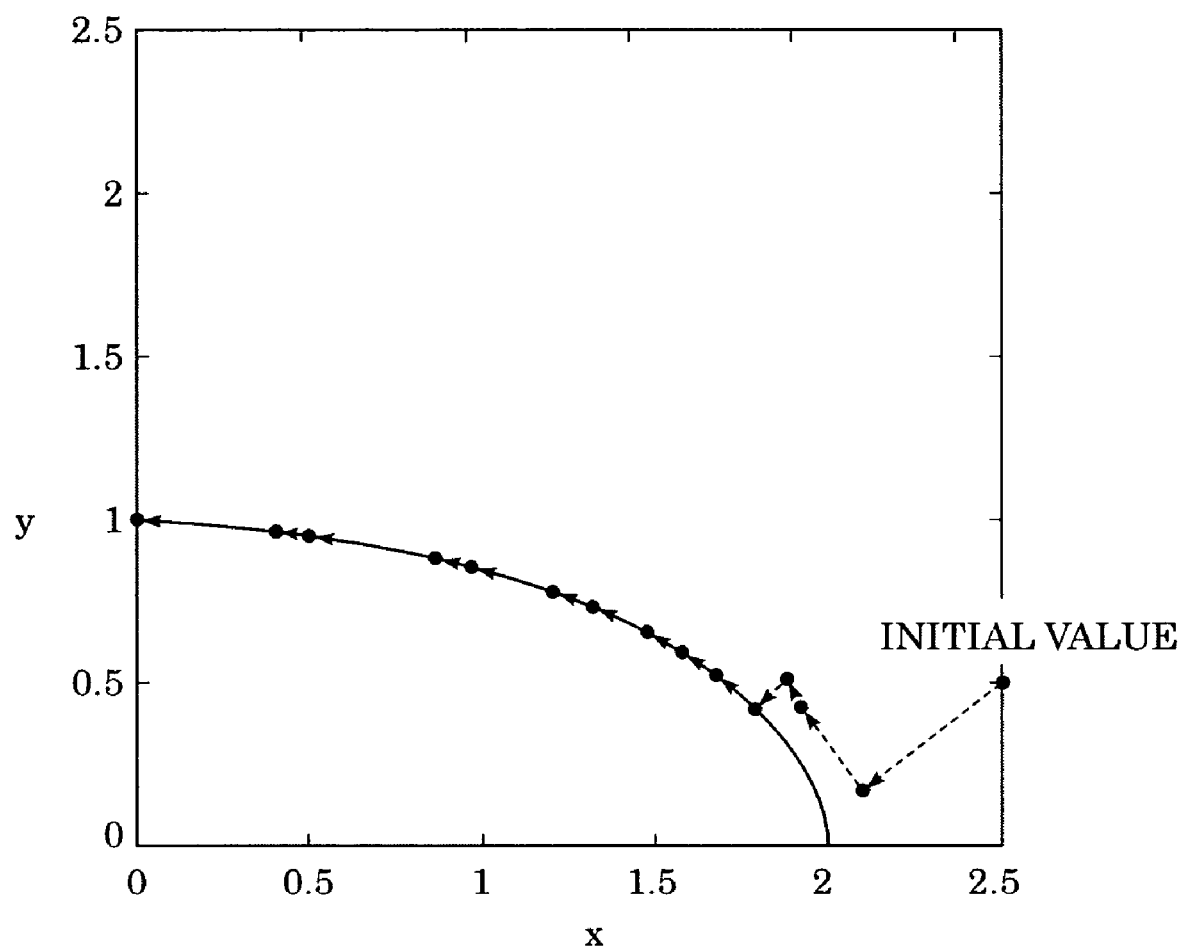
FIG. 7 shows the calculation results according to a third example application.

If this process is carried out, where a=2, b=1, $x_0$=2.5, $y_0$=0.5, d=0.1, and $\epsilon=10^{-7}$, the values start from the initial values (2.5, 0.5) and converge to the values (0.0, 1.0) that minimize the real function E(x, y), as illustrated in FIG. 7.

Fourth Example Application

The constrained optimization algorithm according to a fourth example application is similar to the third example application in that it is based on the second embodiment of the present invention and includes two steps: linearly approximating the hypersurface S(r) and finding extreme values along curved lines having second-order osculation to the plane tangential to the hypersurface S(r)=c in the projection direction of the unit vectors of each axial direction of the coordinate system. Here, for the three-dimensional real vector $$r = \begin{pmatrix} x \\ y \\ z \end{pmatrix},$$

x, y, z∈R, the real function E(r) is to be minimized subject to the constraint condition S(r)=0 where $$S(r) = \frac{x^2}{a^2} + \frac{y^2}{b^2} + \frac{z^2}{c^2} - 1$$

$$E(r) = x^2 + y^2 + z^2.$$

This problem can be solved according to the steps described below.

First Step: Setting the initial value for a point r:

The initial values $x_{(0)}$, $y_{(0)}$, and $z_{(0)}$ are set as x:=$x_{(0)}$, y:=$y_{(0)}$ and z:=$z_{(0)}$.

Second Step: Linearly approximating the hypersurface S(r)=0:

$$S := \frac{x^2}{a^2} + \frac{y^2}{b^2} + \frac{z^2}{c^2} - 1$$

$$S_x := \frac{2x}{a^2}$$

$$S_y := \frac{2y}{b^2}$$

-continued $$S_z := \frac{2z}{c^2}$$

$$t := \frac{S}{S_x^2 + S_y^2 + S_z^2}$$

$x := x - tS_x$ $y := y - tS_y$ $z := z - tS_z$

Third Step: The unit normal vectors:

$$n_x := \frac{S_x}{\sqrt{S_x^2 + S_y^2 + S_z^2}}$$

$$n_y := \frac{S_y}{\sqrt{S_x^2 + S_y^2 + S_z^2}}$$

$$n_z := \frac{S_z}{\sqrt{S_x^2 + S_y^2 + S_z^2}}$$

Fourth Step: Projecting the unit vector $e_i$ in direction i onto the tangent plane (i=1, 2, 3):
for i=1, $G_{1x} = 1 - n_x^2$ $G_{1y} = -n_x n_y$ $G_{1z} = -n_x n_z$ for i=2, $G_{2x} = -n_x n_y$ $G_{2y} = 1 - n_y^2$ $G_{2z} = -n_y n_z$ for i=3, $G_{3x} = -n_x n_z$ $G_{3y} = -n_y n_z$ $G_{3z} = 1 - n_z^2$ Fifth Step: Determining an unknown parameter $\lambda_i$:
for i=1, $$\lambda_1 := -\frac{b^2 c^2 (1 - n_x^2)^2 + a^2 c^2 n_x^2 n_y^2 + a^2 b^2 n_x^2 n_z^2}{a^2 b^2 c^2 (n_x S_x + n_y S_y + n_z S_z)}$$

for i=2, $$\lambda_2 := -\frac{b^2 c^2 n_x^2 n_y^2 + a^2 c^2 (1 - n_y^2)^2 + a^2 b^2 n_y^2 n_z^2}{a^2 b^2 c^2 (n_x S_x + n_y S_y + n_z S_z)}$$

for i=3, $$\lambda_3 := -\frac{b^2 c^2 n_x^2 n_z^2 + a^2 c^2 n_y^2 n_z^2 + a^2 b^2 (1 - n_z^2)^2}{a^2 b^2 c^2 (n_x S_x + n_y S_y + n_z S_z)}$$

Sixth Step: Updating the point r(i=1, 2, 3):

a := 1

$$b := \begin{cases} 2x & (\text{if } i = 1) \\ 2y & (\text{if } i = 2) \\ 2z & (\text{if } i = 3) \end{cases}$$

$s := -b/2a$ $$t_i := \begin{cases} s & \text{if } |s| \le d_i / |G_i| \\ d_i / |G_i| & \text{otherwise} \end{cases}$$

$x := x + t_i G_{ix} + t_i^2 \lambda_i n_x$ $y := y + t_i G_{iy} + t_i^2 \lambda_i n_y$ $z := z + t_i G_{iz} + t_i^2 \lambda_i n_z$ Seventh Step: The process returns to the fourth step.

Eighth Step: Determining convergence:

If $|G_i|$ for each of the directions i(i=1, 2, 3) is smaller than the convergence $\epsilon$, the real function E(r) is assumed to have been minimized, and the process is ended.

Figure 8:
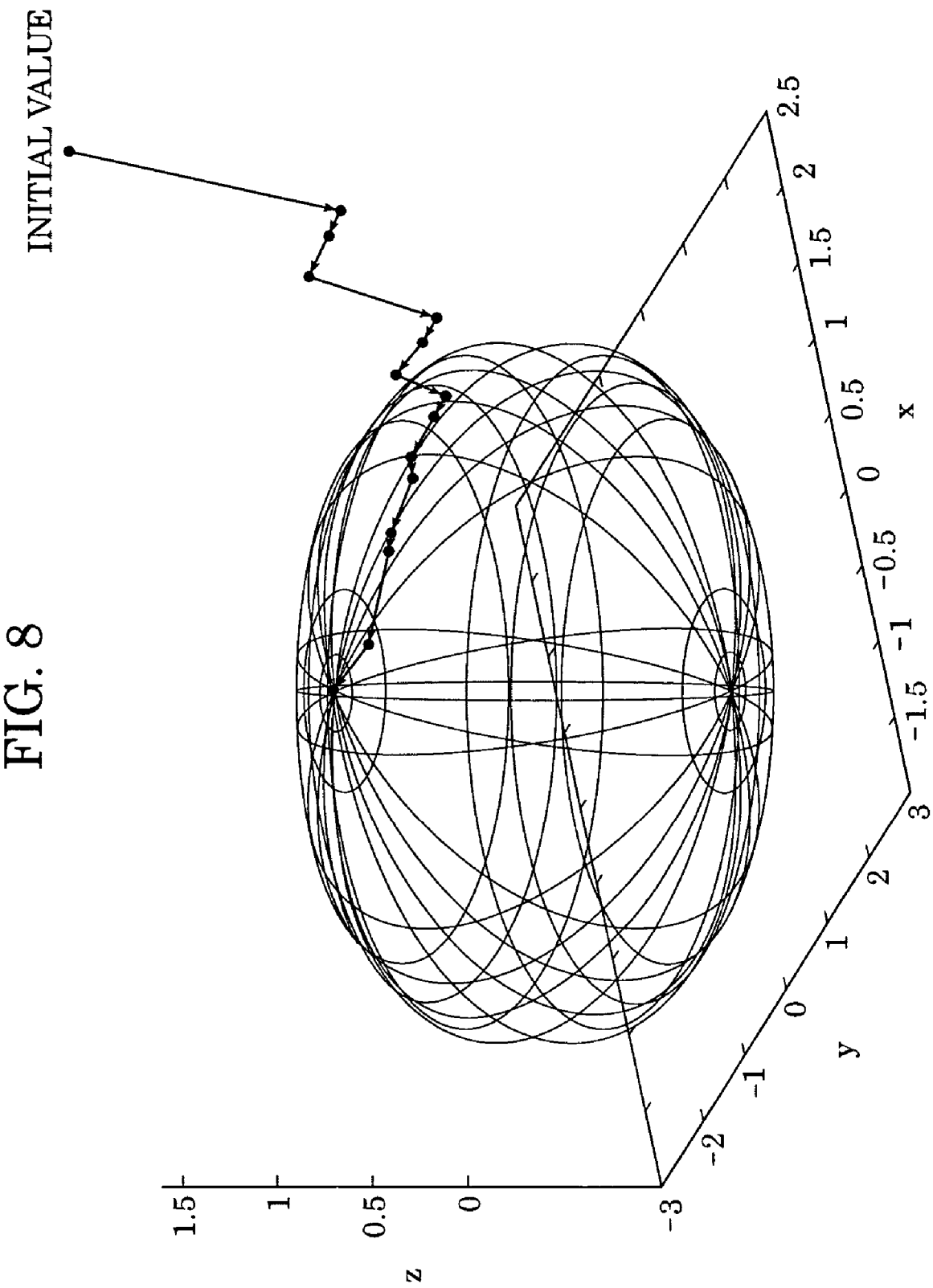
FIG. 8 shows the calculation results according to a fourth example application.

If this process is carried out, where a=3, b=2, c=1, $x_0$=2.5, $y_0$=2.5, $z_0$=2.5, d=0.1, and $\epsilon=10^{-7}$, the values start from the initial values (2.5, 2.5, 2.5) and converge to the values (0.0, 0.0, 1.0) that minimize the real function E(x, y, z), as illustrated in FIG. 8.

By using an algorithm that includes a step of linearly approximating the hypersurface S(r) and a step of finding an extreme value along a curved line having second-order osculation with the geodetic line of the hypersurface S(r)=c passing through a point r, the solution to a constrained optimization problem can be derived through a simple calculation process.

Fifth Example Application

The optimization algorithm according to this embodiment includes two steps: linearly and asymptotically approximating a hypersurface S(r)=0 as a constraint wherein $$r := r - \frac{S(r)}{|\nabla S(r)|^2} \nabla S(r)$$

and finding an extreme value in the projection direction onto a plane tangential to the hypersurface S(r)=c wherein $G := -\nabla E(r) + \langle r, \nabla E(r) \rangle n$ $$s := -\frac{\langle G, \nabla E(r) \rangle}{\langle G, KG \rangle} \left( K_{ij} = \frac{\partial^2 E(r)}{\partial r_i \partial r_j} \right)$$

-continued $$t := \begin{cases} s & \text{if } s \leq L\max/|G| \\ L\max/|G| & \text{otherwise} \end{cases}, \text{ and}$$

$$r := r + tG.$$

if $s \leq L\max/|G|$, and otherwise $$r := r + tG.$$

Here, for the two-dimensional real vector $r = (x, y)$, the real function $E(r)$ is to be minimized subject to the constraint condition $S(r) = 0$ where $$E(r) = x^2 + y^2$$

$$S(r) = ax + by - 1.$$

This problem can be solved according to the steps described below.

First Step: Setting the initial value for a point r:

The initial values $x_{(0)}$ and $y_{(0)}$ are set as $x := x_{(0)}$ and $y := y_{(0)}$.

Second Step: Linearly approximating the hypersurface $S(r) = 0$:

$$S := ax + by - 1$$

$$S_x := a$$

$$S_y := b$$

$$t := \frac{S}{S_x^2 + S_y^2}$$

$$x := x - tS_x$$

$$y := y - tS_y$$

Third Step: The unit normal vector n of the hypersurface $S(r) = c$ passing through the point r:

$$n_x := \frac{S_x}{\sqrt{S_x^2 + S_y^2}}$$

$$n_y := \frac{S_y}{\sqrt{S_x^2 + S_y^2}}$$

Fourth Step: Projecting the gradient vector of the real function $E(r)$ to the tangent plane:

$$E_x := 2x$$

$$E_y := 2y$$

$$G_x := -E_x + (n_x E_x + n_y E_y) n_x$$

$$G_y := -E_y + (n_x E_x + n_y E_y) n_y$$

Fifth Step: Determining convergence:

If $|G| < \epsilon$, then the process is ended.

Sixth Step: Updating the point r along the quadratic curve:

$$\alpha = G_x^2 + G_y^2$$

$$\beta = G_x E_x + G_y E_y$$

$$s := -\beta/2\alpha$$

$$t := \begin{cases} s & \text{if } 0 \leq t \leq L\max/|G| \\ L\max/|G| & \text{otherwise} \end{cases}$$

$$x := x + tG_x$$

$$y := y + tG_y$$

Seventh Step: The process returns to the second step.

Figure 9:
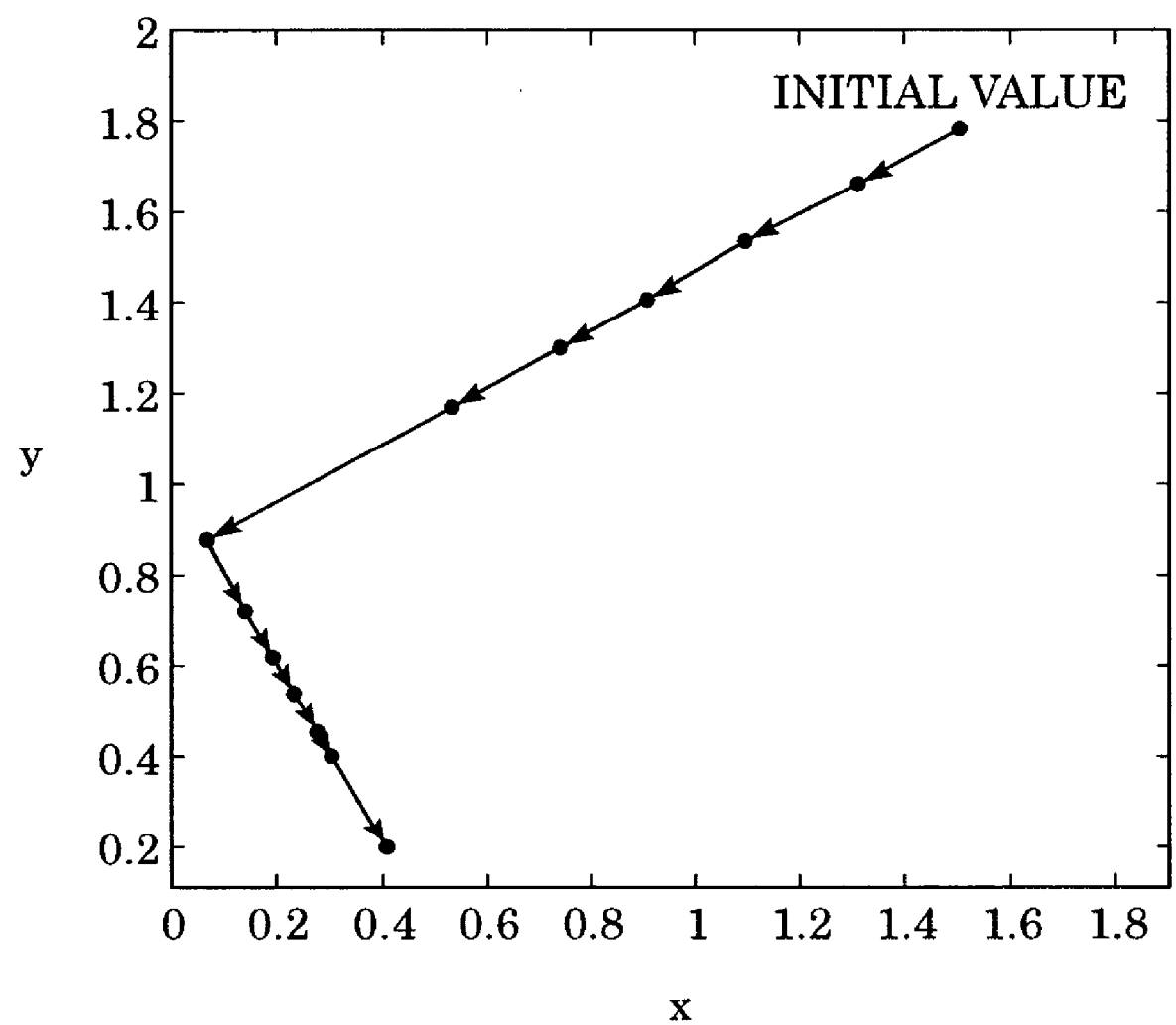
FIG. 9 shows the calculation results according to a fifth example application.

The computational results of carrying out the above-described steps, where $a = 2$, $b = 1$, $x_0 = 1.5$, $y_0 = 1.8$, and $\epsilon = 10^{-8}$, are illustrated in FIG. 9.

As illustrated in FIG. 9, the values start from the initial values (1.5, 1.8) and converge to the values (0.4, 0.2) that minimize the real function $E(x, y)$.

Sixth Example Application

The sixth example application of the optimization algorithm according to the third embodiment of the present invention is similar to the fifth example application in that, for the three-dimensional real vector $r = (x, y, z)$, the real function $E(r)$ is to be minimized subject to the constraint condition $S(r) = 0$ where $$E(r) = x^2 + y^2 + z^2$$

$$S(r) = ax + by + cz - 1.$$

This problem can be solved according to the steps described below.

First Step: Setting the initial value for a point r:

The initial values $x_{(0)}$, $y_{(0)}$, and $z_{(0)}$ are set as $x := x_{(0)}$, $y := y_{(0)}$, and $z := z_{(0)}$.

Second Step: Linearly approximating the hypersurface $S(r) = 0$:

$$S : ax + by + cz - 1$$

$$S_x := a$$

$$S_y := b$$

$$S_z := c$$

$$t := \frac{S}{S_x^2 + S_y^2 + S_z^2}$$

$$x := x - tS_x$$

$$y := y - tS_y$$

$$z := z - tS_z$$

Third Step: The unit normal vectors:

$$n_x := \frac{S_x}{\sqrt{S_x^2 + S_y^2 + S_z^2}}$$

-continued $$n_y := \frac{S_y}{\sqrt{S_x^2 + S_y^2 + S_z^2}}$$

$$n_z := \frac{S_z}{\sqrt{S_x^2 + S_y^2 + S_z^2}}$$

Fourth Step: Projecting the gradient vector of the real function E(r) to the tangent plane:

$E_x = 2x$ $E_y = 2$ $E_z = 2z$ $G_x := -E_x + (n_x E_x + n_y E_y + n_z E_z) n_x$ $G_y := -E_y + (n_x E_x + n_y E_y + n_z E_z) n_y$ $G_z := -E_z + (n_x E_x + n_y E_y + n_z E_z) n_z$

Fifth Step: Determining convergence:

If $|G| < \epsilon$, then the process is ended.

Sixth Step: Updating the point r along the quadratic curve:

$\alpha = G_x^2 + G_y^2 + G_z^2$ $\beta = G_x E_x + G_y E_y + G_z E_z$ $s := -\beta/2\alpha$ $$t := \begin{cases} s & \text{if } 0 \le t \le L\max/|G| \\ L\max/|G| & \text{otherwise} \end{cases}$$

if $0 \le t \le L\max/|G|$ otherwise $x := x + tG_x$ $y := y + tG_y$ $z := y + tG_z$ Seventh Step: The process returns to the second step.

Figure 10:
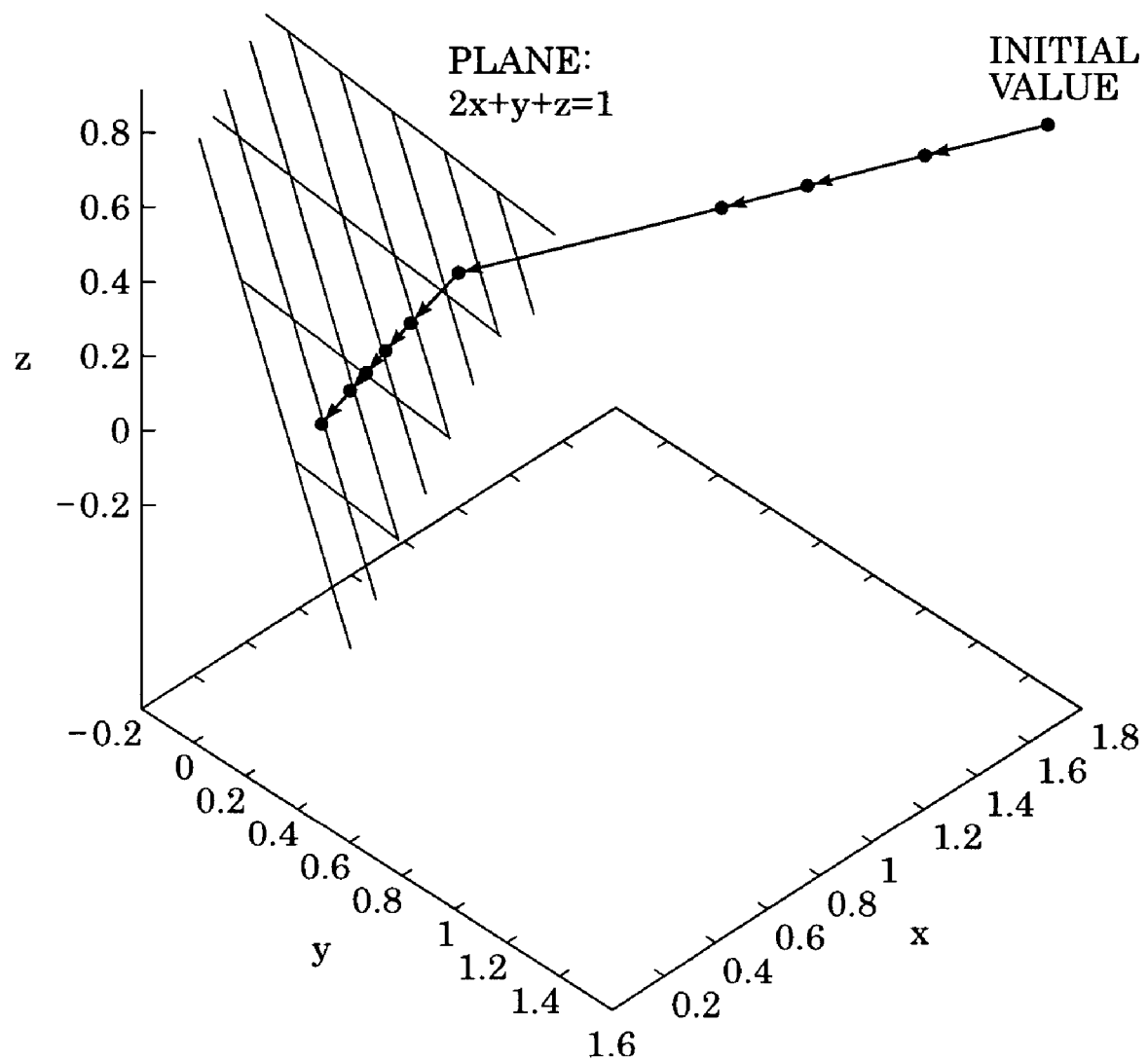
FIG. 10 shows the calculation results according to a sixth example application.

The computational results of carrying out the above-described steps, where a=2, b=1, c=1, $x_0$=1.5, $y_0$=1.8, $z_0$=0.8, and $\epsilon = 10^{-8}$, the values start from the initial values (1.5, 1.8, 0.8) and converge to the values (⅓, ⅙, ⅙) that minimize the real function E(x, y, z), as illustrated in FIG. 10.

As described above, by carrying out the steps according to the fifth and sixth example applications, the solution to a constrained optimization problem can be derived through a simple calculation process.

The present invention is not limited to the above-described embodiments and may be applied to multi-purpose computers, such as personal computers and mainframes that can be used for various purposes, such as scientific computations, business transactions, or controls, in accordance with the software executed. Moreover, the present invention may be applied in a computer that stores an optimization algorithm according to the present invention and that is mainly used for solving optimization problems.

The present invention may be applied to any kind of structure so long as the functions according to the embodiments of the present invention can be realized. For example, the structure of the software and hardware according to the embodiments of the present invention are interchangeable.

The present invention may be realized by supplying a storage medium (or recording medium) storing the program code for the software for realizing the functions of the above-described embodiments to a system or apparatus and by reading out and executing the program code stored on the storage medium (or recording medium) by a computer (CPU or micro-processing unit (MPU)). In this case, the program code read out from the storage medium (or recording medium) realizes the functions of the embodiments, and, thus, the program code is included in the scope of the present invention. The software program code is included in the scope of the present invention when the functions of the above-described embodiments are realized by executing the read-out program code by a computer and also when the functions of the above-described embodiments are realized by an operating system (OS) operating on a computer fully or partially carrying out a process based on the program code.

The program code read out from the storage medium (or recording medium) is included in the scope of the present invention also when the functions according to the above-described embodiments are realized by storing the program code in a memory included in a function expansion board of a computer or a function expansion unit connected to a computer and carrying out the entire process or part of the process according to the software program code by a CPU of the function expansion board or the function expansion unit. When the present invention is applied to the above-described storage medium (or recording medium), the program code corresponding to the above-described flow charts will be stored in the storage medium (or recording medium).

Although the present invention has been described with reference to exemplary embodiments with a certain degree of particularity, many apparently widely different embodiments of the invention can be made without departing from the spirit and the scope thereof. It is to be understood that the invention is not limited to the specific embodiments thereof except as defined in the appended claims.

This application claims priority from Japanese Patent Application No. 2004-073299 filed Mar. 15, 2004, which is hereby incorporated by reference herein.

What is claimed is:

1. A computer implemented constrained optimization method for determining an interface shape, the constrained optimization method comprising:

a computing unit (CPU) which performs linearly approximating a point of interest representing the interface shape of two types of liquids, or a liquid and a gas, held in a container at a constant volume to a first hypersurface representing the constant volume given as a constraint;

a computing unit (CPU) which performs finding an extreme value of an objective function representing an energy of contents in the container by moving the point of interest along a quadratic curve having second-order osculation with a geodetic line of a second hypersurface which is different from the first hypersurface with a constant, the second hypersurface and the geodetic line passing through the point of interest and the geodetic line being directed in a direction in which a gradient vector of the objective function is projected on a plane tangential to the second hypersurface;

a computing unit (CPU) which performs repeating the approximating the point of interest and the finding the extreme value until a predetermined condition is satisfied;

a computing unit (CPU) which performs determining an interface shape corresponding to a current point of interest as a solution of minimizing the energy of the contents in the container at the constant volume if the predetermined condition is satisfied; and a computing unit (CPU) which performs displaying on a display a graph representing the interface shape corresponding to the points of interest repetitively obtained in the approximating the point of interest and the finding the extreme value.

2. The computer implemented constrained optimization method according to claim 1, wherein the geodetic line is represented as $$r(t)=r+tG+t^2\lambda n+o(t^2)$$

where G is the direction, $\lambda$ is a constant, and t is a parameter.

3. The computer implemented constrained optimization method according to claim 1, wherein the geodetic line is represented as $$r(t)=r+tG$$

where G is the direction, and t is a parameter.

4. The computer implemented constrained optimization method according to claim 1, wherein the first hypersurface is represented as $S(r)=0$ and the second hypersurface passes through the point of interest and is represented as $S(r)=c$.

5. The computer implemented constrained optimization method according to claim 4, wherein a point of interest r is updated in accordance with the equation $$r := r - \frac{S(r)}{|\nabla S(r)|^2} \nabla S(r)$$

in the step of linearly approximating, where $\nabla$ is a differential operator denoting a gradient of the hypersurface $S(r)$.

6. The computer implemented constrained optimization method according to claim 1, wherein the quadratic curve comprises a plurality of curved lines having second-order osculation with the plane tangential to the second hypersurface in the projection directions of the coordinate axes, and the step of finding the extreme value is carried out for each of the plurality of quadratic curves.

7. The computer implemented constrained optimization method according to claim 1, wherein the energy comprises a surface energy and a gravitational energy.

8. A computer readable program stored in a storage medium for controlling a computer to determine an interface shape, the program comprising code for causing the computer to perform steps of:

performing by a computing unit (CPU) linearly approximating a point of interest representing the interface shape of two types of liquids, or a liquid and a gas, held in a container at a constant volume to a first hypersurface representing the constant volume given as a constraint;

performing by a computing unit (CPU) finding an extreme value of an objective function representing an energy of contents in the container by moving the point of interest along a quadratic curve having second-order osculation with a geodetic line of a second hypersurface which is different from the first hypersurface with a constant, the second hypersurface and the geodetic line passing through the point of interest and the geodetic line being directed in a direction in which a gradient vector of the objective function is projected on a plane tangential to the second hypersurface;

performing by a computing unit (CPU) repeating the approximating the point of interest and the finding the extreme value until a predetermined condition is satisfied;

performing by a computing unit (CPU) determining an interface shape corresponding to a current point of interest as a solution of minimizing the energy of the contents in the container at the constant volume if the predetermined condition is satisfied; and performing by a computing unit (CPU) displaying on a display a graph representing the interface shape corresponding to the points of interest repetitively obtained in the approximating the point of interest and the finding the extreme value.

* * * * *